US 6,577,165 B1

(12) United States Patent
Cheung et al.

(10) Patent No.: US 6,577,165 B1
(45) Date of Patent: Jun. 10, 2003

(54) UNI-SIZED CLOCK BUFFERS

(75) Inventors: Cyrus C. Cheung, Hercules, CA (US); Keith D. Au, Woodland Hills, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/027,960

(22) Filed: Oct. 25, 2001

(51) Int. Cl.[7] .................................................. G06F 1/10
(52) U.S. Cl. ........................ 326/93; 326/101; 327/295; 327/297
(58) Field of Search ............... 326/93, 101, 47; 327/295, 297

(56) References Cited

U.S. PATENT DOCUMENTS

| | | | | |
|---|---|---|---|---|
| 5,923,188 A | * | 7/1999 | Kametani et al. | 326/93 |
| 6,204,713 B1 | * | 3/2001 | Adams et al. | 327/295 |
| 6,313,683 B1 | * | 11/2001 | Block et al. | 327/295 |
| 6,356,116 B1 | * | 3/2002 | Oh | 326/93 |

* cited by examiner

Primary Examiner—Daniel Chang
(74) Attorney, Agent, or Firm—Trexler, Bushnell, Giangiorgi, Blackstone & Marr, Ltd.

(57) ABSTRACT

A system which simplifies the clock tuning process for a clock buffer tree. Essentially, a clock buffer tree is provided where the clock buffer tree includes clock buffers of different strengths. The different strength clock buffers which are in the clock buffer tree have the same pin-out configuration. Hence, it is easy and straightforward to upsize or downsize any of the clock buffers in the clock buffer tree, and it is guaranteed that the new cell will fit into the old cell's slot in the tree. Since none of the nets need to be modified, consistent timing results are achieved. Moreover, the new timing for the modified clock buffer can be anticipated because its wire loading does not change at all. The ease of clock tuning makes it much easier to design clock buffer trees and layouts, and allows the overall design to be completed faster and easier.

4 Claims, 3 Drawing Sheets

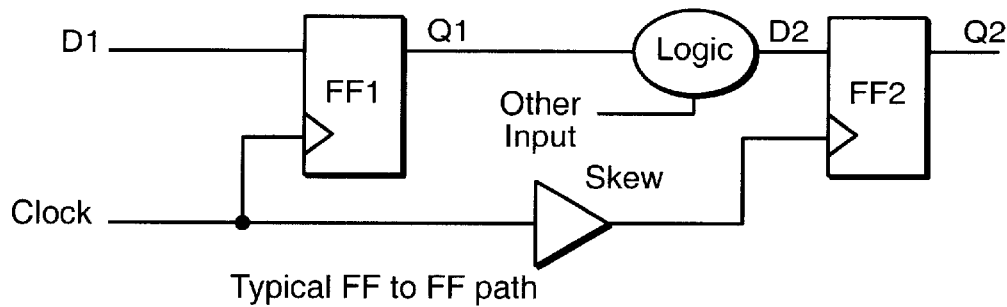
FIG._1
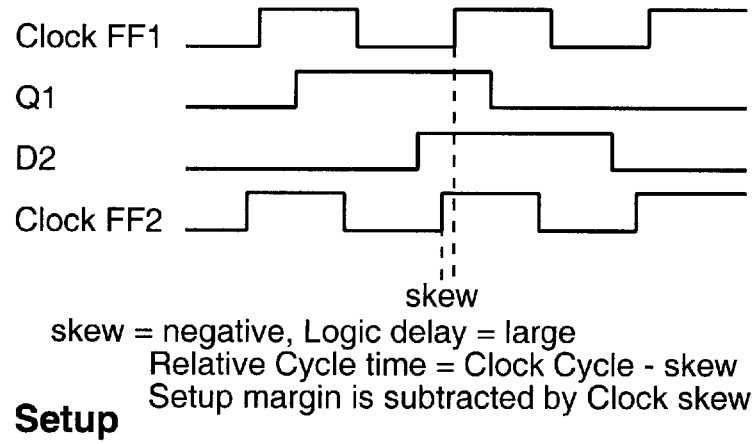
skew = negative, Logic delay = large
Relative Cycle time = Clock Cycle - skew
Setup margin is subtracted by Clock skew
Setup
FIG._2
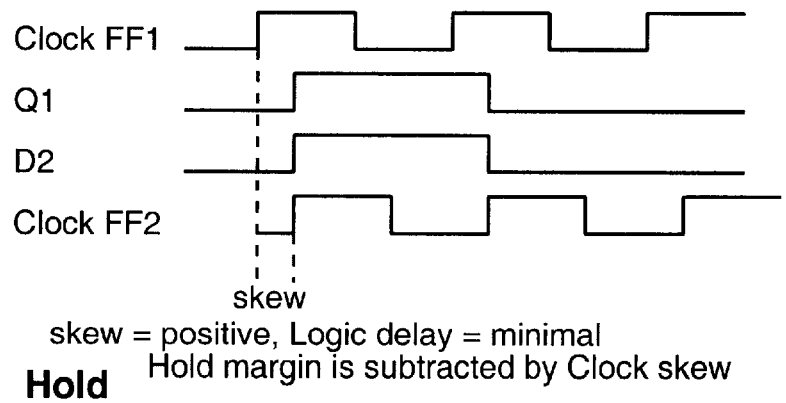
skew = positive, Logic delay = minimal
Hold margin is subtracted by Clock skew
Hold
FIG._3

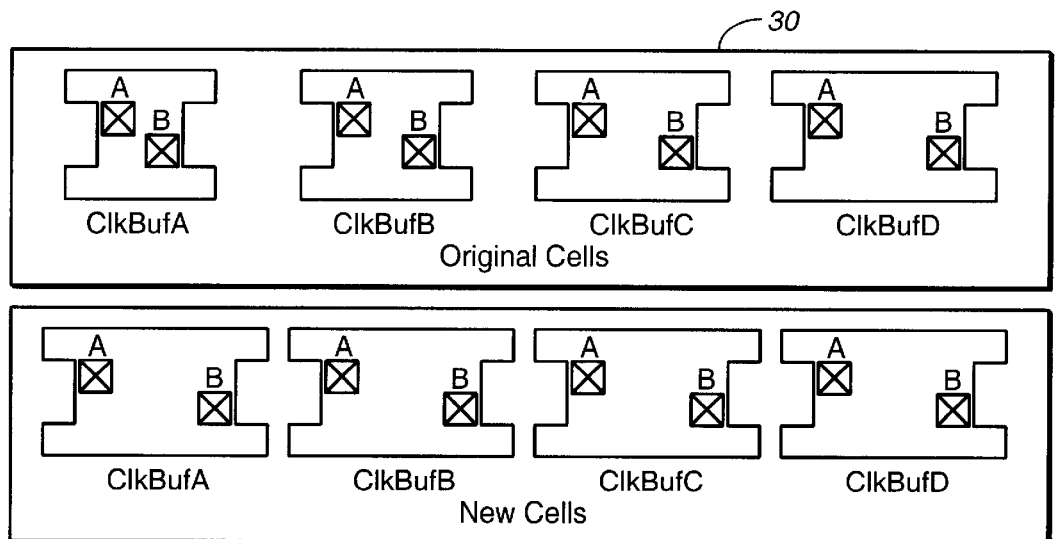
FIG._4
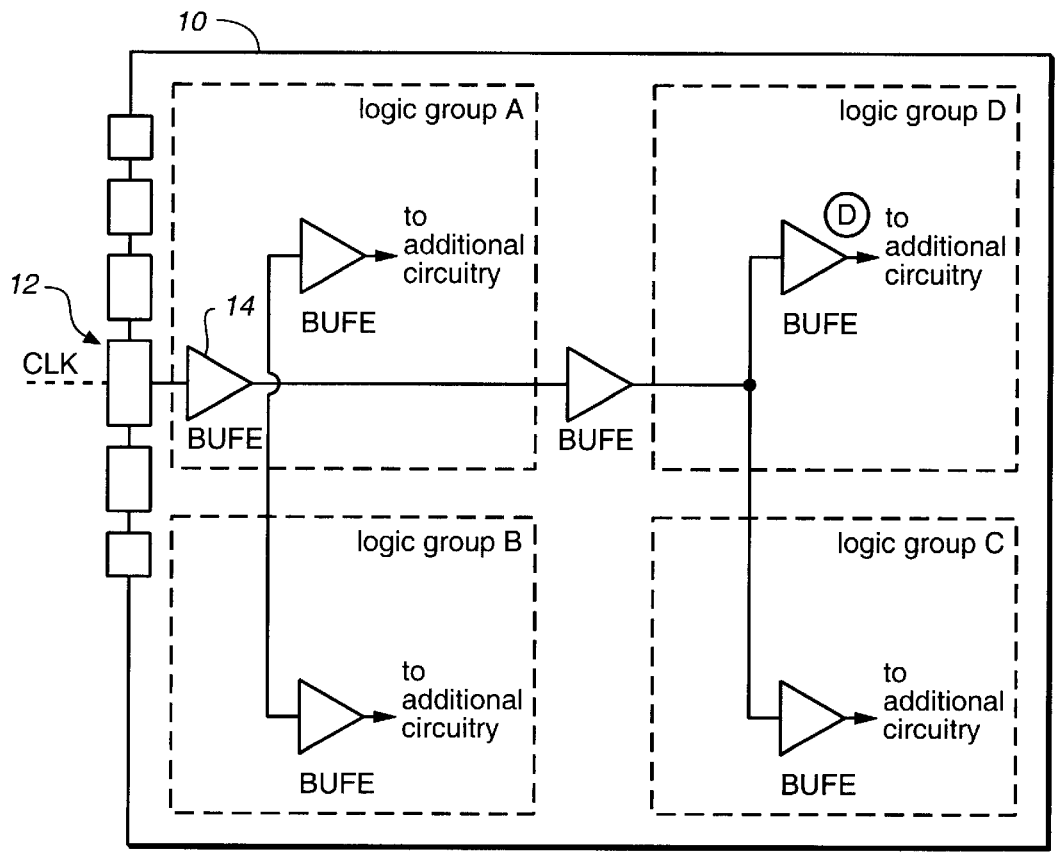
FIG._5

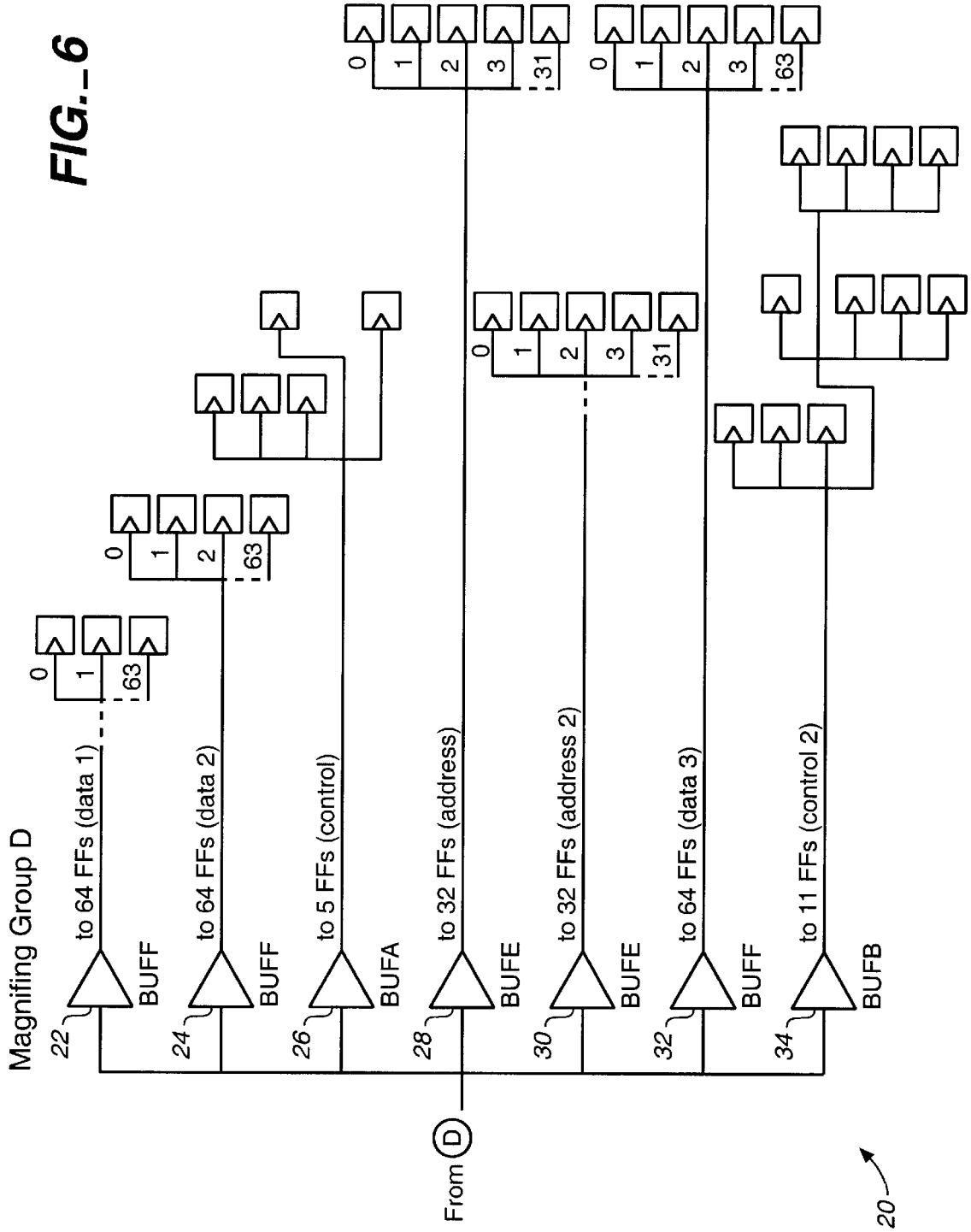
FIG._6

UNI-SIZED CLOCK BUFFERS

FIELD OF THE INVENTION

The present invention generally relates to clock buffer trees, and more specifically relates to a new clock buffer tree wherein all of the clock buffers have the same pin-outs, thereby providing that it is relatively easy to upsize or downsize any of the clock buffers in the tree.

BACKGROUND OF THE INVENTION

A clock buffer tree allows a single clock source to effectively drives thousands of Flip-Flops. Specifically, one clock buffer may drive four clock buffers, and those four clock buffers drive sixteen clock buffers until the clock buffer is strong enough to drive the desired number of Flip-Flops. However, no matter how many clock buffers there are in a clock buffer tree, there are clock skew problems due to the fact that the clock tools are never perfect. Ideally, the smaller the clock skew, the less problem there is for setup and hold times. Hence, less effort is required to perform Static Timing Analysis (STA), and less time is needed to tune the clock in the layout. However, in reality, initially there is always a clock skew problem of some sort.

FIGS. 1–3 illustrate the potential setup and hold time problems when clock skew is encountered. Specifically, FIG. 1 shows the typical Flip-Flop to Flip-Flop path. FIG. 2 shows how clock skew may effect Setup. FIG. 2 shows the situation where the skew is negative, the logic delay is large, the Relative Cycle Time is equal to the clock cycle minus skew, and the Setup margin is subtracted by the clock skew. FIG. 3 is similar to FIG. 2, and shows how clock skew may effect Hold. FIG. 3 shows the situation where the skew is positive, the logic delay is minimal, and the Hold margin is subtracted by the clock skew.

When designing ASIC's, different strength clock buffers are typically used to combat clock skew problems. In other words, clock buffer trees have clock buffers of different strengths mixed in throughout the clock buffer tree. For example, a clock buffer tree may include "A" strength, "B" strength, "C" strength . . . and "F" strength clock buffers, wherein "A" strength clock buffers have lower drive strength than "B" strength clock buffers, and "B" strength clock buffers have substantially lower drive strength than "F" strength clock buffers, which have very a strong drive strength.

A problem with including clock buffers of different strengths within a clock buffer tree is that clock buffers of different strengths do not have the same pin-outs. In other words, clock buffers of different strengths consume different amounts of real estate on the chip. Hence, it may be difficult, after designing the clock buffer tree, to upsize any of the clock buffers in the tree. The difficulty may arise because there may be congestion around the clock buffers. In such case, it would be difficult to replace one sized clock buffer with another sized clock buffer in the clock buffer tree, and it may be difficult to route to the new cell. This often dramatically slows the progress of layout design, and dramatically slows the performance of Static Timing Analysis (STA). In addition, adjacent cells and nets may have to be moved or re-routed as well as the nets which relate to the cell which is being upsized. This often makes the new result very unpredictable. In the end, cells may need to be upsized, downsized and move around the chip in order to arrive at a design which is satisfactory.

This clock tuning process is often very lengthy, repetitive, and can be frustrating to both the engineer designing the clock buffer tree and the layout person who is designing the overall layout.

OBJECTS AND SUMMARY OF THE INVENTION

A general object of an embodiment of the present invention is to provide a system which simplifies the clock tuning process for a clock buffer tree.

Another object of an embodiment of the present invention is to provide a clock buffer tree which has clock buffers of different strengths, but where the different strength clock buffers have the same pin-out configuration.

Still another object of an embodiment of the present invention is to provide a clock buffer tree that has a plurality of clock buffers which have different strengths but identical pin-out configurations.

By providing that a clock buffer tree has clock buffers of different strengths, but the same pin-out configuration, it is easy and straightforward to upsize or downsize any of the clock buffers in the clock buffer tree. Unlike in prior art configurations, it is guaranteed that the new cell will fit into the old cell's slot in the tree. Since none of the nets, including the cell being changed or any of the adjacent cells, needs to be modified, consistent timing results can be achieved. Moreover, the new timing for the modified clock buffer can be anticipated because its wire loading does not change at all. The ease of clock tuning makes it much easier to design clock buffer trees and layouts, and allows the overall design to be completed faster and easier.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a circuit diagram showing a typical Flip-Flop to Flip-Flop path;

FIG. 2 is a signal diagram illustrating potential setup time problems when clock skew is encountered;

FIG. 3 is a signal diagram illustrating potential hold time problems when clock skew is encountered;

FIG. 4 shows two sets of clock buffers, each having a different drive strength—a first set (the top set) is in accordance with the prior art, and provides that the clock buffers have different pin-out configurations, a second set (the bottom set) is accordance with the present invention, and provides that the clock buffers have the same pin-out configuration;

FIG. 5 illustrates a chip that includes four logic groups; and

FIG. 6 illustrates one of the logic groups shown in FIG. 5 in more detail, where the logic group includes a clock buffer tree.

DESCRIPTION

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 5 illustrates a chip 10 that includes four logic group—logic group A, B, C and D. A clock signal ("clk" in FIG. 5) is received through clock input pin 12, and the clock signal drives clock buffer 14 which drives logic groups A and B, and drives clock buffer 16 which drives logic groups C and D. The clock buffers 14 and 16 illustrated in FIG. 5 are indicated as being "BUFE" which means that the clock buffers 14 and 16 have strong drive strengths (i.e. they are "E" strength clock buffers).

FIG. 6 illustrates logic group D in more detail, and logic group D is representative of the other logic groups on the chip. As shown in FIG. 6, the logic group includes a clock buffer tree 20 consisting of a plarality of clock buffers 22, 24, 26, 28, 30, 32, 34 having different drive strengths. For example, clock buffers 22, 24 and 32 drive sixty four Flip-Flops and have a high drive strength. Clock buffers 22, 24 and 32 are indicated as being "BUFF" meaning that they are "F" strength clock buffers. Clock buffers 28 and 30 drive thirty-two Flip-Flops and hence have a slightly lower drive strength. Clock buffers 28 and 30 are indicated as being "BUFE" meaning that they are "E" strength clock buffers. Clock buffer 34 drives eleven Flip-Flops and hence has a lower drive strength than clock buffers 22, 24, 28, 30 or 32. Clock buffer 34 is indicated as being "BUFB" meaning that it is a "B" strength clock buffer. Clock buffer 26 drives five Flip-Flops and hence has a lower drive strength than clock buffers 22, 24, 28, 30, 32 or 34. Clock buffer 26 is indicated as being "BUFA" meaning that it is an "A" strength clock buffer.

The top set 30 of clock buffers shown in FIG. 4 is a set of clock buffers which are in accordance with the prior art. Specifically, the clock buffers have different drive strengths—thus "ClkBufA", "ClkBufB", ClkBufC" and "ClkBufD" meaning that they are A strength, B strength, C strength and D strength, respectively—and have different pin out configurations. In contrast, the bottom set 40 of clock buffers shown in FIG. 4 illustrates a set of clock buffers which are in accordance with the present invention, wherein the clock buffers have the same pin out configuration even though they have different drive strengths.

If the clock buffer tree 20 shown in FIG. 6 were to be configured in accordance with the prior art (i.e. the top set 30 of clock buffers shown in FIG. 4), then clock buffers 22, 24 and 32, being of a higher drive strength than clock buffers 28 and 30, would have different pin-out configurations than clock buffers 28 and 30. Likewise, clock buffers 28 and 30, being of a higher drive strength than clock buffer 34, would have different pin-out configurations than clock buffer 34. Finally, clock buffer 34, being of a higher drive strength than clock buffer 26, would have a different pin-out configuration than clock buffer 26. Hence, it would be difficult, after designing the clock buffer tree 20, to upsize any of the clock buffers in the tree. The difficulty would likely arise because of congestion around the clock buffers 22–34. In such case, it would be difficult to replace one sized clock buffer with another sized clock buffer in the clock buffer tree, and it may be difficult to route to the new cell. This may dramatically slow the progress of layout design, and may dramatically slow the performance of Static Timing Analysis (STA). In addition, adjacent cells and nets may have to be moved or re-routed as well as the nets which relate to the cell which is being upsized. This often makes the new result very unpredictable. In the end, cells may need to be upsized, downsized and move around the chip in order to arrive at a design which is satisfactory. This clock tuning process is often very lengthy, repetitive, and can be frustrating to both the engineer designing the clock buffer tree and the layout person who is designing the overall layout.

In contrast to prior art clock buffer trees, the present invention provides that all of the clock buffers 22–34 in the clock buffer tree 20 have the same pin out configurations, despite the fact that they may have different drive strengths (see the bottom set 40 of clock buffers shown in FIG. 4). If the buffer clock tree 20 shown in FIG. 6 is configured in accordance with the present invention, wherein all of the clock buffers 22–34 have the same pin out configuration despite the fact that they have different drive strengths, it is easy and straightforward to upsize or downsize any of the clock buffers 22–34 in the clock buffer tree 20. Unlike in prior art configurations, it is guaranteed that the new cell will fit into the old cell's slot in the tree. Since none of the nets, including the cell being changed or any of the adjacent cells, needs to be modified, consistent timing results can be achieved. Moreover, the new timing for the modified clock buffer can be anticipated because its wire loading does not change at all. The ease of clock tuning makes it much easier to design clock buffer trees and layouts, and allows the overall design to be completed faster and easier.

Hence, a method of designing a clock buffer tree in accordance with the present invention may include designing an initial version of the clock buffer tree wherein the clock buffer tree includes a plurality of clock buffers having different drive strengths but the same pin-out configuration, and then upsizing or downsizing a drive strength of an unwanted clock buffer in the clock buffer tree by replacing the unwanted clock buffer with a new clock buffer, wherein the new clock buffer has a different drive strength than the unwanted clock buffer, but has the same pin-out configuration as the unwanted clock buffer, thus rendering the switch straightforward and easy.

While an embodiment of the present invention is shown and described, it is envisioned that those skilled in the art may devise various modifications of the present invention without departing from the spirit and scope of the appended claims.

What is claimed is:

1. A clock buffer tree comprising:
   a plurality of cells having different drive strength clock buffers, each cell having identical pin-out configurations,
   wherein each of said plurality of cells identical in size and is interchangeable with another one of said plurality of cells such that a strength of said clock buffer tree is changeable without requiring wiring redesign.

2. A clock buffer tree as recited in claim 1, wherein the clock buffer tree comprises a first cell connected to less than six Flip-Flops, and a second cell connected to more than sixty Flip-Flops, wherein the first cell has a lower drive strength than the second cell, and wherein the first and second cells have the same pin-out configuration and said first cell is interchangeable with said second cell.

3. A clock buffer tree comprising:
   a first cell connected to a set of five Flip-Flops;
   a second cell connected to a set of eleven Flip-Flops;
   a third cell connected to a set of thirty-two Flip-Flops;
   a fourth cell connected to a set of sixty-four Flip-Flops, wherein the first cell has a lower drive strength than the second cell, wherein the second cell has a lower drive strength than the third cell, wherein the third cell has a lower drive strength than the fourth cell, and wherein the first, second, third and fourth cells have the same pin-out configuration, are the same size and are interchangeable such that when said cells are interchanged, wiring redesign is not required.

4. A method of designing a clock buffer tree comprising:

designing an initial version of the clock buffer tree wherein the clock buffer tree includes a plurality of cells having different drive strengths but the same pin-out configuration and wherein each of said plurality of cells is the same size; and upsizing or downsizing a drive strength of an unwanted cells in the clock buffer tree by replacing the unwanted cell with a new cell, wherein the new cell has a different drive strength than the unwanted cell, but has the same pin-out configuration as the unwanted cell and wherein said new cell is the same size as said unwanted cell and wiring redesign is not required.

* * * * *